(12) United States Patent
Ikeda

(10) Patent No.: US 8,903,220 B2
(45) Date of Patent: Dec. 2, 2014

(54) VIDEO DATA OUTPUTTING APPARATUS AND METHOD OF CONTROLLING VIDEO DATA OUTPUTTING APPARATUS

(71) Applicant: Canon Kabushiki Kaisha, Tokyo (JP)

(72) Inventor: Takeshi Ikeda, Ebina (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/054,133

(22) Filed: Oct. 15, 2013

(65) Prior Publication Data

US 2014/0037266 A1    Feb. 6, 2014

Related U.S. Application Data

(63) Continuation of application No. 12/498,194, filed on Jul. 6, 2009, now Pat. No. 8,582,949.

(30) Foreign Application Priority Data

Jul. 7, 2008    (JP) ................................. 2008-176891

(51) Int. Cl.
| | |
|---|---|
| *H04N 9/80* | (2006.01) |
| *H04N 9/79* | (2006.01) |
| *H04N 21/442* | (2011.01) |
| *H04N 21/432* | (2011.01) |
| *H04N 5/44* | (2011.01) |
| *H04N 21/443* | (2011.01) |
| *H04N 5/775* | (2006.01) |
| *H04N 5/63* | (2006.01) |

(52) U.S. Cl.
CPC ........... *H04N 9/79* (2013.01); *H04N 21/44231* (2013.01); *H04N 21/4325* (2013.01); *H04N 5/44* (2013.01); *H04N 21/4436* (2013.01); *H04N 5/775* (2013.01); *H04N 5/63* (2013.01)

USPC .......................................................... 386/239

(58) Field of Classification Search
USPC .................. 386/200, 212, 213, 239, 248, 291
See application file for complete search history.

(56) References Cited

U.S. PATENT DOCUMENTS

| | | | |
|---|---|---|---|
| 2006/0253778 A1* | 11/2006 | Kim ............................... | 715/700 |
| 2007/0192782 A1* | 8/2007 | Ramaswamy .................... | 725/9 |
| 2008/0074411 A1* | 3/2008 | Yamashita ..................... | 345/211 |

FOREIGN PATENT DOCUMENTS

| | | |
|---|---|---|
| JP | 03-205654 A | 9/1991 |
| JP | 07-220370 A | 8/1995 |
| JP | 2005-197854 A | 7/2005 |
| WO | 2008-072349 A | 6/2008 |

* cited by examiner

*Primary Examiner* — Tat Chio

(74) *Attorney, Agent, or Firm* — Canon U.S.A. Inc., IP Division

(57) ABSTRACT

A video data outputting apparatus, connected to a display apparatus receiving a broadcast signal and transmits video data recorded in an internal recording unit and/or an inserted recording medium, and video data generated based on the received broadcast signal to the display apparatus play-backs the stored video data, acquires input selection information indicating the input source of the currently displayed video data, and performs control to display information about the broadcast channel corresponding to currently output video data and the video of the broadcast channel on an image area when the video data generated based on the broadcast signal is being output to the display apparatus after the playback is stopped and the display apparatus receives the video data transmitted from the video data outputting apparatus. Then, the video data outputting apparatus is caused to transition to a state where the power consumption of the own apparatus is reduced.

9 Claims, 8 Drawing Sheets

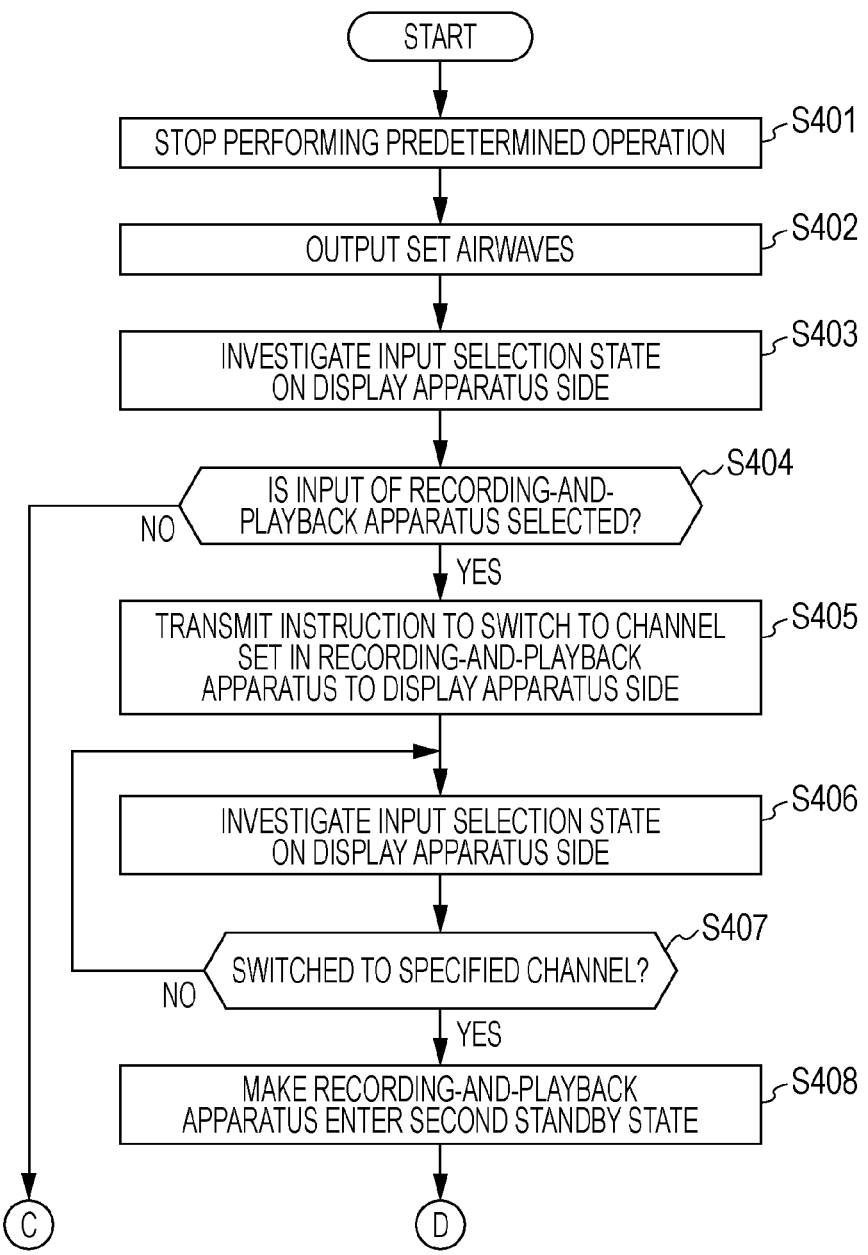

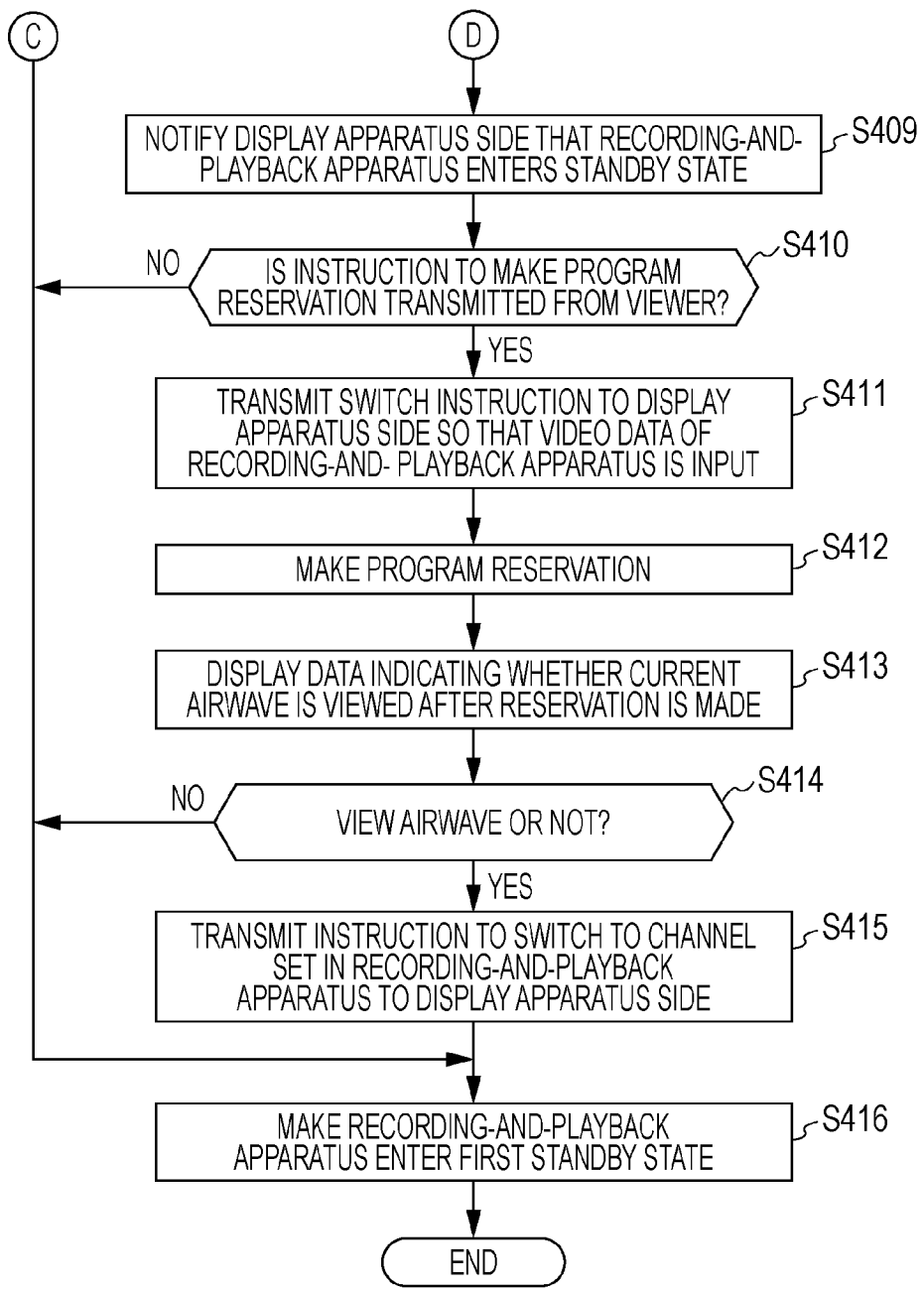

VIDEO DATA OUTPUTTING APPARATUS AND METHOD OF CONTROLLING VIDEO DATA OUTPUTTING APPARATUS

CROSS REFERENCE TO RELATED APPLICATIONS

This application is a Continuation of U.S. patent application Ser. No. 12/498,194 filed Jul. 6, 2009, which claims priority to JP 2008-176891 filed on Jul. 7, 2008, each of which are hereby incorporated by reference herein in their entireties.

BACKGROUND OF THE INVENTION

1. Field of the Invention

The present invention relates to a video data outputting apparatus connected to a display apparatus that can receive an airwave and a method of controlling the video data outputting apparatus.

2. Description of the Related Art

In the past, a display apparatus that receives an airwave and a video data outputting apparatus that can receive the airwave were connected to each other, so as to view the video of a program recorded through the video data outputting apparatus and/or commercially available video by using the display apparatus. For reducing power unnecessarily consumed by the video data outputting apparatus during standby after the viewing is finished, video data outputting apparatuses disclosed in Japanese Patent Laid-Open No. 2006-012207, Japanese Patent Laid-Open No. 2004-023221, and so forth have been proposed.

The video data outputting apparatus disclosed in Japanese Patent Laid-Open No. 2006-012207 automatically stops the power when a predetermined time has elapsed after a predetermined operation is finished. Further, the following method has been proposed. Namely, when a television receiver disclosed in Japanese Patent Laid-Open No. 2004-023221 is connected to a plurality of external devices and a viewer changes the external device used for viewing video to another external device, the television receiver controls the power of the external device to which the television receiver had been connected at the same time as when the change is made so that the power is stopped.

On the other hand, when the viewer finishes a predetermined playback operation in the video data outputting apparatus, the video of an airwave transmitted to the video data outputting apparatus may be transmitted to a display apparatus by using the video data outputting apparatus so that the video of the airwave is displayed for viewing on the image area of the display apparatus, which means that both the display apparatus and the video data outputting apparatus consume power. In such cases, the display apparatus displays the video of the airwave received through the video data outputting apparatus even though the display apparatus can receive the airwave, which means that the power of the video data outputting apparatus is unnecessarily consumed.

In such cases, the technology disclosed in Japanese Patent Laid-Open No. 2006-012207 allows for automatically stopping the power of the video data outputting apparatus when a predetermined time has elapsed after a predetermined operation is finished. As a result, the screen image displayed by the display apparatus abruptly disappears. Then, the viewer switches a signal displayed on the image area of the display apparatus from a signal obtained through the video data outputting apparatus functioning as an external input device to the video signal of an airwave transmitted to the display apparatus, and sets a channel that had been used for viewing the video. The viewer has to perform the above-described operation to view a program that had been viewed through the video data outputting apparatus. That is to say, the technology disclosed in Japanese Patent Laid-Open No. 2006-012207 can reduce power unnecessarily consumed by the video data outputting apparatus in place of giving the viewer discomforts.

Further, under the above-described circumstances, it is difficult for the technology disclosed in Japanese Patent Laid-Open No. 2004-023221 to stop the power of the connected external device unless the viewer performs the external-input-change operation in the television receiver. Therefore, the external device unnecessarily keeps consuming power during standby until the operation is performed by the viewer.

SUMMARY OF THE INVENTION

The present invention has been made in consideration of the above situation, and has as its object to provide a video data outputting apparatus and a method of controlling the video data outputting apparatus that can reduce power unnecessarily consumed by the apparatus without giving a viewer discomforts such as an interruption of the currently viewed airwaves.

According to the present invention, the foregoing objet is attained by providing a video data outputting apparatus connectable to a display apparatus, both the video data outputting apparatus and the display apparatus being capable of receiving a broadcast signal, the video data outputting apparatus being further capable of transmitting, to the display apparatus, video data generated based on the received broadcast signal, the video data outputting apparatus including:

an acquisition unit configured to acquire input selection information indicating an input source of video data currently displayed by the display apparatus; and a control unit configured to transmit, to the display apparatus in a case when the input selection information indicates that the input source is the video data outputting apparatus:

i) information about a broadcast channel corresponding to the broadcast signal corresponding to video data currently output by the video data outputting apparatus, and ii) an instruction command to instruct the display apparatus to receive the broadcast channel directly and to display the video data corresponding to the broadcast signal, wherein the control unit is further configured to cause the video data outputting apparatus to enter a first low-power consumption state in which a power consumption of the video data outputting apparatus is reduced, after the instruction command is transmitted to the display apparatus.

Other features and advantages of the present invention will be apparent from the following description of exemplary embodiments with reference to the attached drawings, in which like reference characters designate the same or similar parts throughout the figures thereof.

BRIEF DESCRIPTION OF THE DRAWINGS

FIG. 7 is a flowchart showing control performed by the video data outputting apparatus according to the third embodiment.

FIG. 8 is a flowchart continued from the flowchart shown in FIG. 7.

DESCRIPTION OF THE EMBODIMENTS

Exemplary embodiments of the present invention will now be described in detail with reference to the accompanying drawings.

First Embodiment

Configuration According to First Embodiment

Figure 1:
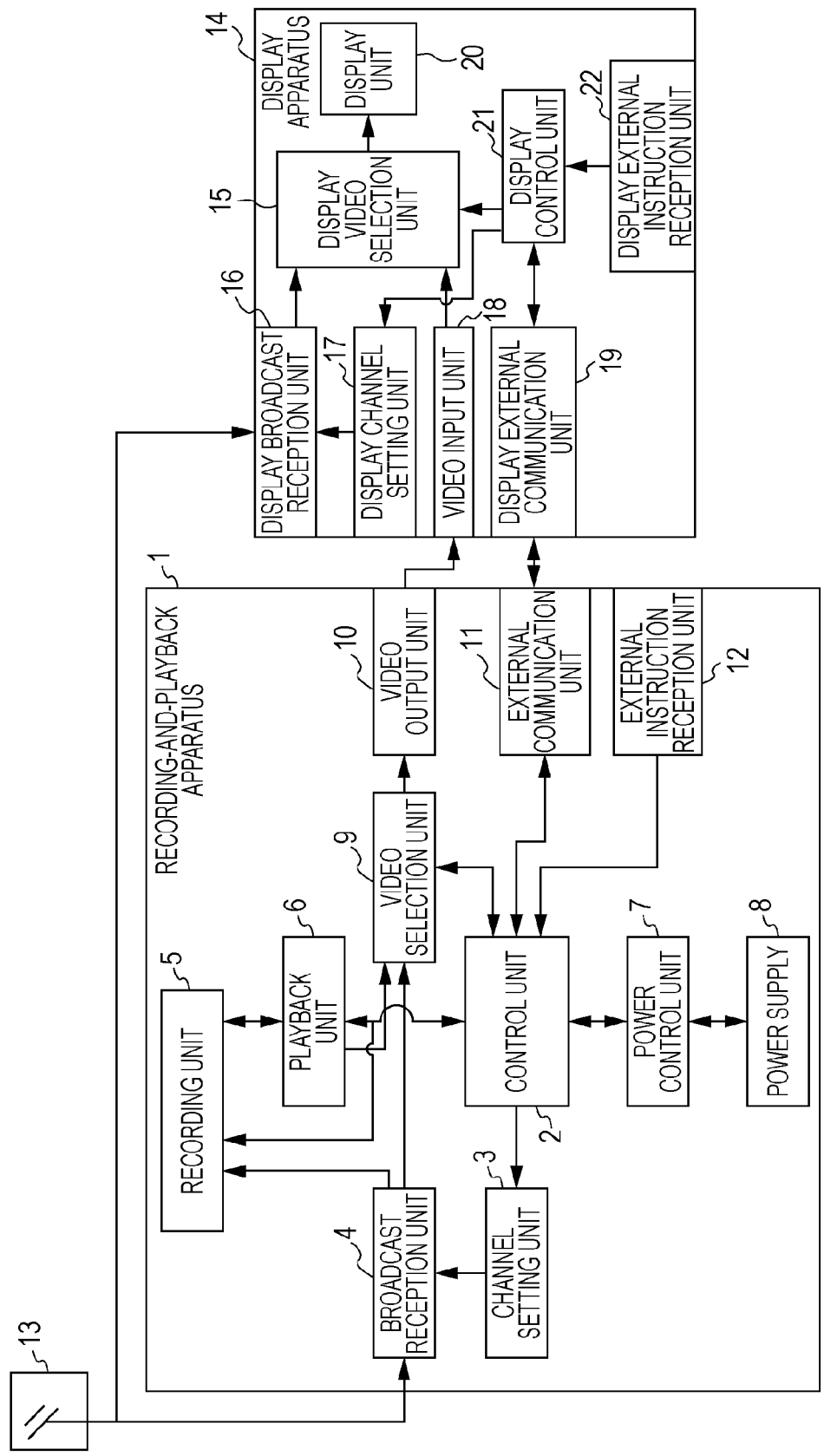
FIG. 1 is a functional block diagram showing a video data outputting apparatus and a display apparatus according to a first embodiment of the present invention.

FIG. 1 is a functional block diagram showing a video data outputting apparatus 1 and a display apparatus 14 according to a first embodiment of the present invention. In the present invention, the video data outputting apparatus is a recording-and-playback apparatus that is capable to recording the broadcast signal and playing-back the recorded broadcast signal.

The above-described recording-and-playback apparatus 1 is connected to the display apparatus 14 including a television (TV) or the like. Further, signal data including video data or the like displayed through the display apparatus 14 is recorded onto a recording medium (described later) including a hard disk drive (HDD), etc. Still further, the recording-and-playback apparatus 1 can receive airwaves independently of the display apparatus 14. Hereinafter, the above-described configuration will be described in detail.

As shown in FIG. 1, each of the recording-and-recording apparatus 1 and the display apparatus 14 can receive TV airwaves transmitted from a TV antenna 13. The recording-and-playback apparatus 1 includes a control unit 2, a channel setting unit 3, a broadcast reception unit 4, a recording unit 5, a playback unit 6, a power control unit 7, a power supply 8, a video selection unit 9, a video output unit 10, an external communication unit 11, and an external instruction reception unit 12.

The control unit 2 is connected to the channel setting unit 3, the recording unit 5, the playback unit 6, the power control unit 7, the video selection unit 9, the external communication unit 11, and the external instruction reception unit 12, so as to perform control and/or communications. The channel setting unit 3 converts the value of a channel set through the control unit 2 into a frequency value, and sets data of the frequency value to the broadcast reception unit 4. The broadcast reception unit 4 receives the RF signal of the frequency set through the channel setting unit 3 from among the RF signals transmitted from the TV antenna 13. In the case where a digital broadcasting is performed, the transmitted RF signal is converted into a transport stream (TS) signal, and the TS signal is converted into a Moving-Picture-Experts-Group-phase 2 (MPEG-2) signal. Then, the MPEG-2 signal is converted into a video signal including a YCbCr signal, an RGB signal, and so forth, and transmitted to the video selection unit 9 and the recording unit 5. For transmitting the signal to the recording unit 5, the TS signal may be transmitted as the video signal.

Upon receiving a record instruction transmitted from the control unit 2, the recording unit 5 records the video signal transmitted from the broadcast reception unit 4 onto a recording medium provided in the recording unit 5. Upon receiving an instruction transmitted from the control unit 2, the playback unit 6 play-backs the video signals recorded through the recording unit 5 and commercially available video signals recorded onto a digital versatile disk (DVD), and transmits the played-back video signals to the video selection unit 9. In the above-described embodiment, the DVD is used as the recording medium. However, without being limited to the above-described embodiment, the recording medium may be a medium that can store and play-back a video signal, where the medium includes, for example, a Blu-ray disc, a high-definition (HD)-DVD, a video home system (VHS), an SD memory card, and so forth.

Upon receiving an instruction issued from the control unit 2, the power control unit 7 controls the power supply 8. The power supply 8 supplies power to each of the blocks of the recording-and-playback apparatus 1 and turns on/off the above-described power supply under the control of the power control unit 7. Under the control of the control unit 2, the video selection unit 9 selects either a video signal transmitted from the broadcast reception unit 4 or a video signal transmitted from the playback unit 6 and transmits the selected video signal to the video output unit 10.

The video output unit 10 converts the video signal transmitted from the video selection unit 9 into format data for external transmission. According to the above-described embodiment, the converted video signal is transmitted to the video input unit 18 of the display apparatus 14. Here, the video signal for the external transmission may be either a digital signal or an analog signal.

The external communication unit 11 is connected to the display external communication unit 19 of the display apparatus 14. Namely, the external communication unit 11 is used to achieve mutual communications for information of the control unit 2 and that of the display control unit 21. For performing the above-described communications, IEEE 1394, a control signal of a high-definition multimedia interface (HDMI), and so forth have been used. However, any method, any apparatus and/or device, and so forth that can perform communications may be used without being limited to the above-described embodiment.

The external instruction reception unit 12 receives an external instruction, that is, an instruction issued from a viewer and transmits the instruction to the control unit 2. Although not disclosed in the above-described embodiment, the interface of the external instruction reception unit 12 includes a switch and/or the reception unit of a remote control unit, for example.

On the other hand, the display apparatus 14 includes a display video selection unit 15, a display broadcast reception unit 16, a display channel setting unit 17, a video input unit 18, a display external communication unit 19, a display unit 20, a display control unit 21, and a display external instruction reception unit 22.

The display video selection unit 15, the display broadcast reception unit 16, and the display channel setting unit 17 that are provided in the display apparatus 14 individually have the same functions as those of the video selection unit 9, the broadcast reception unit 4, and the channel setting unit 3 that are provided in the recording-and-playback apparatus 1. Further, the display external communication unit 19 and the display external instruction reception unit 22 that are provided in the display apparatus 14 individually have the same functions as those of the external communication unit 11 and the external instruction reception unit 12 that are provided in the recording-and-playback apparatus 1.

The video input unit 18 of the display apparatus 14 receives a video signal transmitted from the video output unit 10 of the recording-and-playback apparatus 1 and transmits the transmitted video signal to the display video selection unit 15. The display unit 20 displays an image of the video signal transmitted from the display video selection unit 15. The device of the display unit 20 may be anything that can be used as a display device including a liquid crystal display, a plasma display, a cathode-ray tube, an organic electroluminescent (EL) display, an inorganic EL display, a field emission display, and so forth.

The display control unit 21 is connected to the display video selection unit 15, the display external communication unit 19, the display channel setting unit 17, the display video selection unit 15, and the display external instruction reception unit 22, so as to control the display apparatus 14 and/or perform external communications.

<Operations Performed in First Embodiment>

Figure 2:
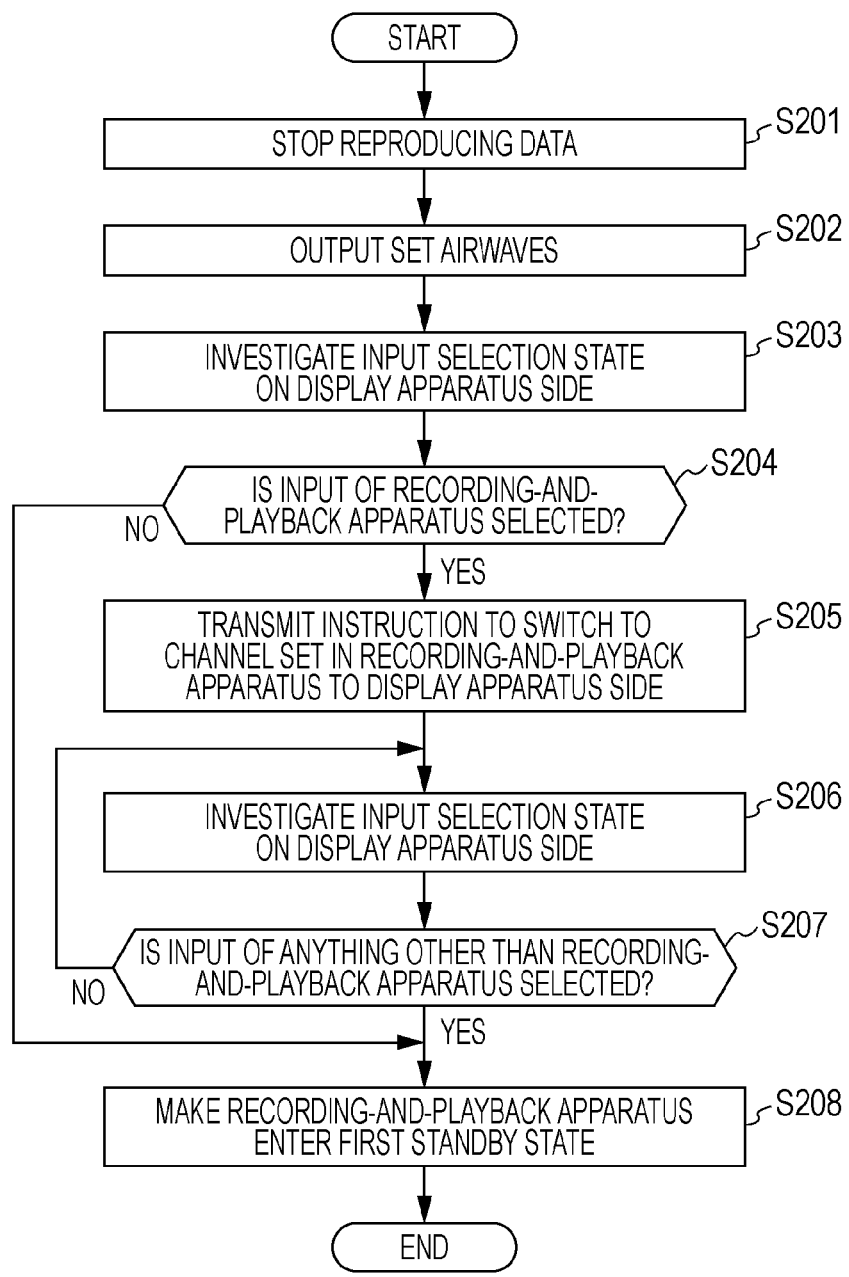
FIG. 2 is a flowchart showing control performed by the video data outputting apparatus according to the first embodiment.

Next, operations performed in the first embodiment will be described with reference to a flowchart shown in FIG. 2. The above-described flowchart shows control performed by the recording-and-playback apparatus 1 according to the first embodiment.

First, at step S201, the control unit 2 transmits a stop instruction to the playback unit 6 in response to an instruction to stop a playback operation, the instruction being transmitted from the viewer to the external instruction reception unit 12. Otherwise, the playback unit 6 stops playing-back recorded video data when the playback of the recorded images is completed. The playback unit 6 transmits information indicating that the playback is stopped to the control unit 2. After the processing corresponding to step S201 is performed, the processing of the control unit 2 advances to step S202.

After the data playback is stopped, the control unit 2 of the recording-and-playback apparatus 1 transmits the airwaves of a channel set before the playback is performed to the display apparatus 14 at step S202. For performing the processing corresponding to step S202, the control unit 2 instructs the video selection unit 9 to select video data transmitted to the broadcast reception unit 4 and transfer the selected video data to the video output unit 10. The above-described processing is the same as that had been performed in a known recording-and-playback apparatus.

Next, at step S203, the control unit 2 investigates the input selection state of a video signal of which image is displayed on the display apparatus 14 (hereinafter referred to as a video input selection state). The video input selection state indicates whether the display apparatus 14 displays video, at present, through an airwave obtained via the display broadcast reception unit 16 or an external input device such as the recording-and-playback apparatus 1. In the case where the external input device is used, the video input selection state indicates which external input device is selected to display the image. For performing the processing corresponding to step S203, the control unit 2 investigates the current video input selection state of the display apparatus 14 by communicating with the display control unit 21 via the external communication unit 11 and the display external communication unit 19 of the display apparatus 14. The above-described investigation is achieved by the control unit 2 acquiring input selection information indicating the video input selection state, the input selection information being transmitted from the display apparatus 14.

At step S204, it is determined whether or not the video input is selected so that the display apparatus 14 displays the image of the video data transmitted from the recording-and-playback apparatus 1 at step S202 based on the input selection information indicating the video input selection state of the display apparatus 14, the input selection information being acquired at step S203. If the answer to the above-described determination is YES, the processing advances to step S205. If the answer is NO, the processing advances to step S208. In the case where the answer is NO at step S204, the viewer views video obtained through the airwaves transmitted to the display apparatus 14 and/or an external input device other than the recording-and-playback apparatus 1. In that case, the recording-and-playback apparatus 1 is immediately made to enter the first standby state at step S208 so as to reduce energy consumption.

For performing the processing corresponding to step S204, the control unit 2 determines whether the display apparatus 14 selects the video data transmitted from the recording-and-playback apparatus 1. Further, for making the recording-and-playback apparatus 1 enter the first standby state at step S208, the control unit 2, in the first place, transmits a control instruction to enter the first standby state to the power control unit 7. Next, the power control unit 7 transmits an instruction to the power supply 8 so as to stop the supply of power to each of the blocks except for the control unit 2, the power control unit 7, the external communication unit 11, and the external instruction reception unit 12. Then, the power supply 8 stops the supply of power to each of the blocks based on the instruction. Consequently, the recording-and-playback apparatus 1 enters the first standby state.

The processing corresponding to step S205 is executed when the answer to the determination made at step S204 is YES. Namely, when the display apparatus 14 selects the video data transmitted from the recording-and-playback apparatus 1, it is highly possible that the viewer views the video of the airwave transmitted to the recording-and-playback apparatus 1 through the display apparatus 14. Therefore, at step S205, the recording-and-playback apparatus 1 notifies the display apparatus 14 of the channel of the airwave set in the recording-and-playback apparatus 1. Further, the recording-and-playback apparatus 1 instructs the display apparatus 14 to change the current video input selection state of the external input device so that the video input device is switched from the video input of the recording-and-playback apparatus 1 to a video input device which receives the airwave of the channel of which the display apparatus 14 is notified. The above-described control is achieved when the control unit 2 transmits the channel information and the control instruction to the display control unit 21 of the display apparatus 14 via the external communication unit 11 and the display external communication unit 19 of the display apparatus 14.

At step S206, the control unit 2 investigates the state of the video input selection performed on the display-apparatus-14 side again so as to determine whether the channel is switched to the channel specified by the recording-and-playback apparatus 1 at step S205. Next, at step S207, the control unit 2 determines whether the video input selection state of the display apparatus 14, the video input selection state being investigated at step S206, indicates that video data input from any device other than the recording-and-playback apparatus 1 is selected. If video data other than the video data input from the recording-and-playback apparatus 1 is input (when the answer is YES), the processing shown in the flowchart is caused to transition to step S208 so that the recording-and-playback apparatus 1 is made to enter the first standby state.

On the other hand, when the video data transmitted from the recording-and-playback apparatus 1 is displayed on the display apparatus 14 (when the answer is NO), the processing of the flowchart is returned to step S206, and the processing procedures corresponding to steps S206 and S207 are performed repeatedly until video data other than the video data input from the recording-and-playback apparatus 1 is externally transmitted. At the above-described steps, the control unit 2 makes the determinations.

<Advantages of First Embodiment>

For example, when a video signal generated based on a broadcast signal is transmitted to the display apparatus 14 and the display apparatus 14 selects a signal input from the recording-and-playback apparatus 1 and displays video after the viewer finishes performing a predetermined operation such as stopping the playback operation in the recording-and-playback apparatus 1, it is determined that the viewer views the video of airwaves transmitted to the recording-and-playback apparatus 1 and the following processing is performed. That is to say, the recording-and-playback apparatus 1 sets the channel of the airwave set in the recording-and-playback apparatus 1 to the display apparatus 14 that can receive the airwave and performs control so that the video input of the display apparatus 14 is changed to the airwave. After the change is made, the recording-and-playback apparatus 1 enters a standby state.

Accordingly, when the viewer keeps watching the video of the airwaves transmitted to the recording-and-playback apparatus 1 through the display apparatus 14 after performing a predetermined playback operation through the recording-and-playback apparatus 1, the following advantage are obtained. Namely, the device receiving the airwaves is automatically switched from the recording-and-playback apparatus 1 which had finished its operations to the display apparatus 14 without causing the currently viewed airwaves to pause. Consequently, it becomes possible to reduce power unnecessarily consumed by the recording-and-playback apparatus 1 without giving the viewer discomforts.

As for the time when the video input of the display apparatus 14 is changed to the airwave, the change may be made after commercials, a scene change, and so forth are detected. Consequently, the video change can be made more smoothly than in the past.

Second Embodiment

Next, a second embodiment of the present invention will be described.

<Configuration According to Second Embodiment>

Figure 3:
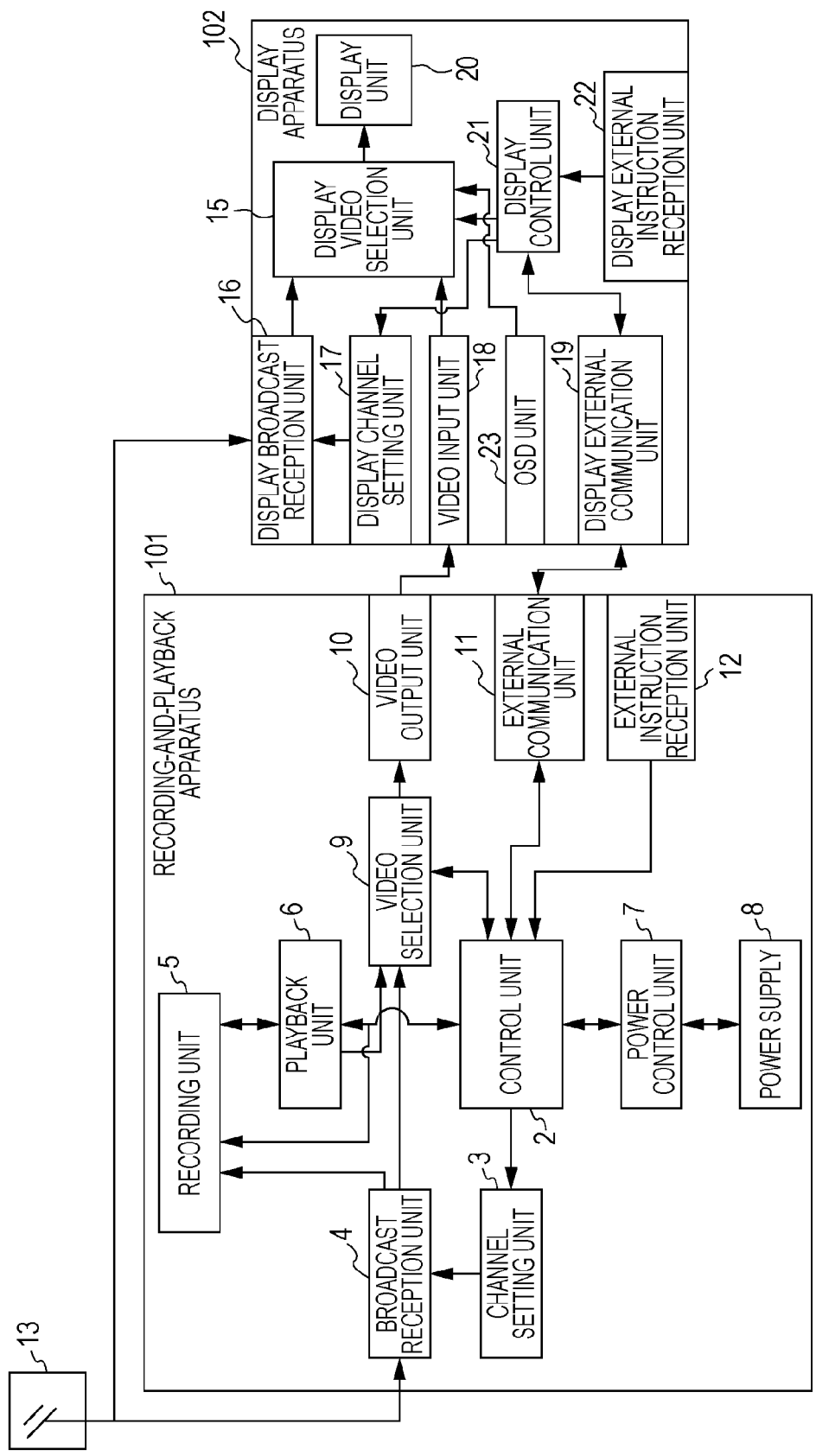
FIG. 3 is a functional block diagram showing a video data outputting apparatus according to a second embodiment of the present invention.

FIG. 3 is a functional block diagram of a recording-and-playback apparatus 101 according to the second embodiment.

The configuration of the above-described recording-and-playback apparatus 101 is identical to that of the recording-and-playback apparatus 1 described in the first embodiment except that a display apparatus 102 according to the second embodiment is provided, the display apparatus 102 being produced by providing an on-screen-display (OSD) unit 23 in the display apparatus 14 described in the first embodiment.

The OSD unit 23 is connected to the display control unit 21. Upon receiving an instruction issued from the display control unit 21, the OSD unit 23 transmits data of text such as characters to the display video selection unit 15 at predetermined time. The blocks other than the OSD unit 23 are identical to those described in the first embodiment.

<Operations Performed in Second Embodiment>

Figure 4:
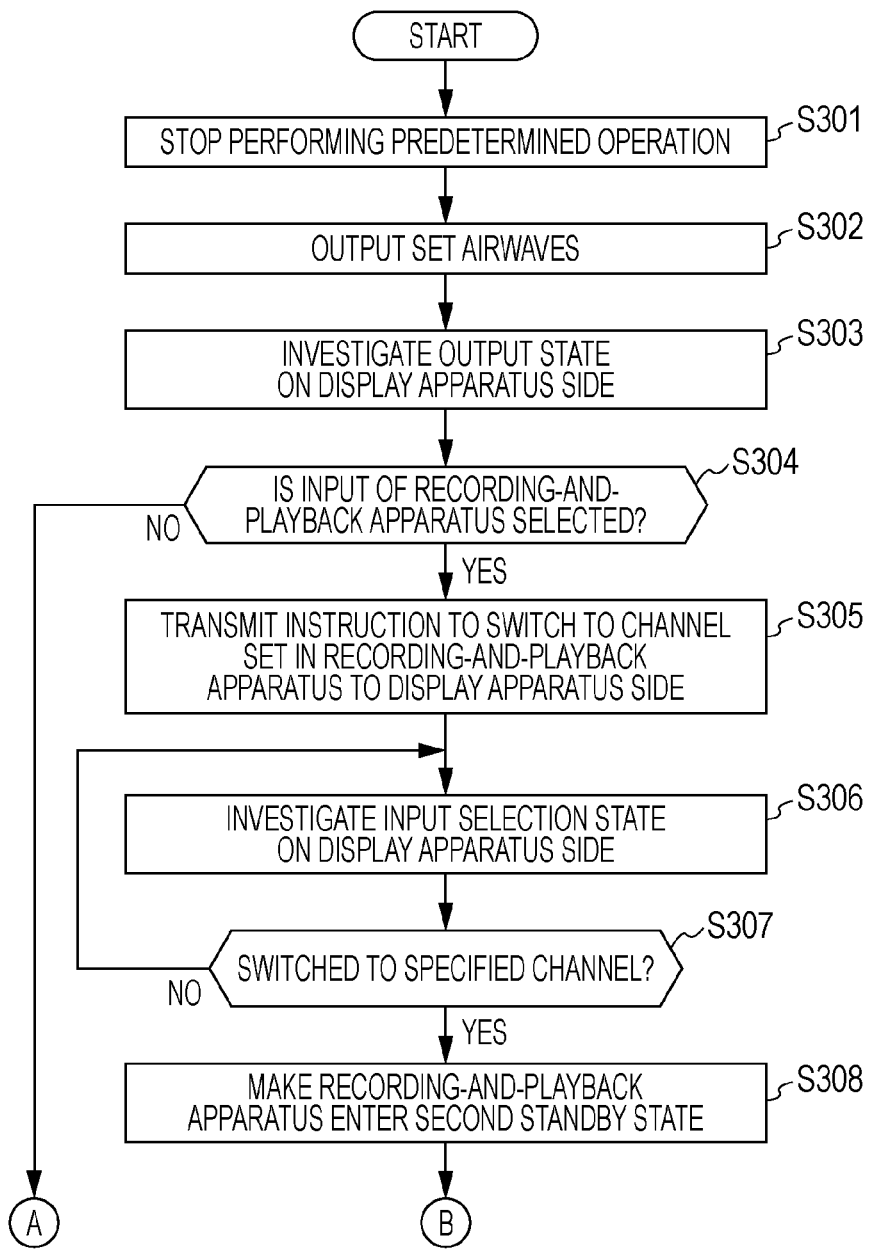
FIG. 4 is a flowchart showing control performed by the video data outputting apparatus according to the second embodiment.
Figure 5:
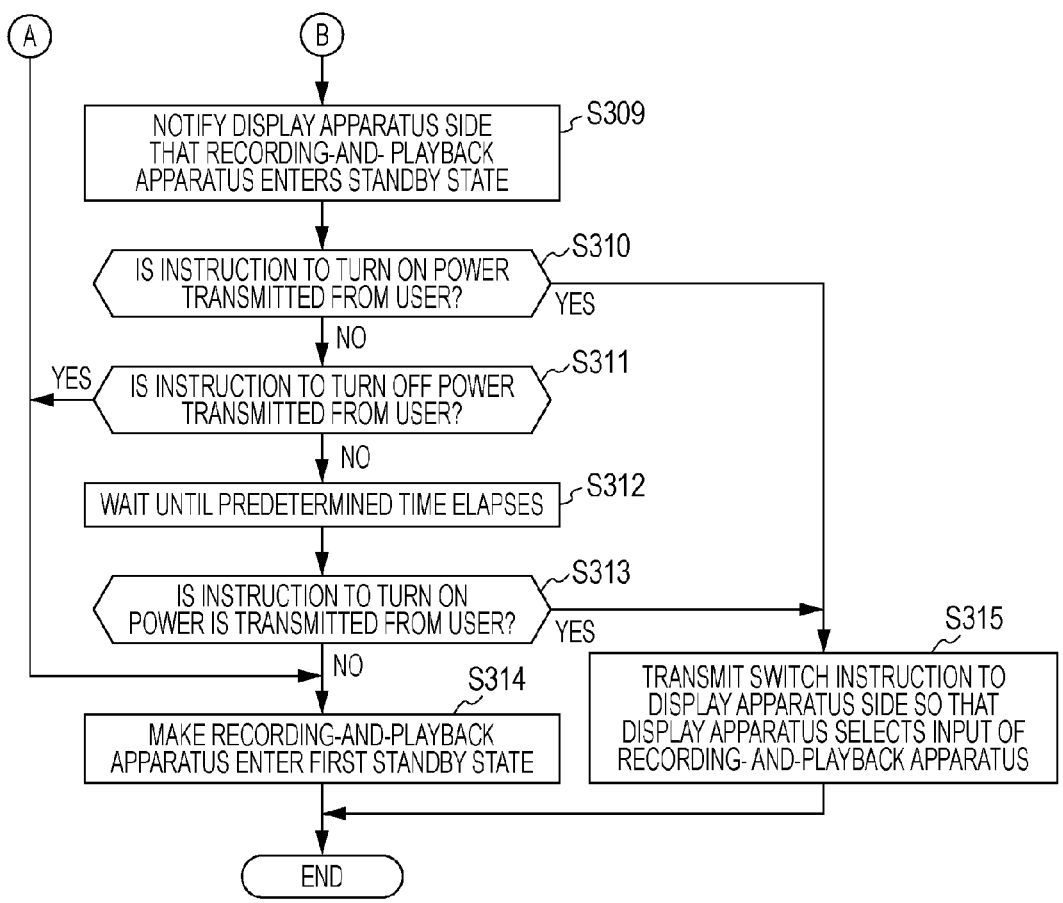
FIG. 5 is a flowchart continued from the flowchart shown in FIG. 4.

Next, operations performed in the second embodiment will be described with reference to FIGS. 4 and 5. FIGS. 4 and 5 show a flowchart indicating control performed by the recording-and-playback apparatus 101 according to the second embodiment.

First, at step S301, the control unit detects that the recording-and-playback apparatus 101 finishes a predetermined operation. In the second embodiment, finishing the predetermined operation denotes stopping the data playback as is the case with the first embodiment. In addition to that, finishing the predetermined operation denotes finishing an operation such as making a recording reservation that had been performed before the control unit 2 switches over to an operation performed to transmit an airwave from the video output unit 10. When the control unit 2 detects that the predetermined operation is finished, the processing advances to step S302.

Since the processing procedures performed at steps S302, S303, S304, S305, S306, and S307 individually correspond to those performed at steps S202 to S207 that are described in the first embodiment, the descriptions thereof will be omitted.

If it is determined that the video input selection state of the display apparatus 14 indicates that video data other than that input from the recording-and-playback apparatus 1 is selected, that is to say, if it is determined that the channel is switched to a specified channel at step S307, the control unit 2 performs the processing corresponding to step S308.

At step S308, the recording-and-playback apparatus 101 is made to enter the second standby state. At step S308, first, the control unit 2 instructs the power control unit 7 to enter the second standby state. Then, the power control unit 7 instructs the power supply 8 to stop supplying power to at least one predetermined block, whereby the recording-and-playback apparatus 101 is made to enter the second standby state. In the above-described embodiment, the power supply 8 stops supplying power to the blocks other than the control unit 2, the power control unit 7, the external communication unit 11, the external instruction reception unit 12, the recording unit 5, and the playback unit 6.

When the viewer wishes to make the control unit 2 perform an operation such as turning on the power supply 8, it takes a shorter time to start the operation in the second standby state than in the first standby state. When the above-described condition is satisfied, the power supply 8 may stop supplying power to any blocks without being limited to the above-described embodiment.

At step S309, the viewer is notified that the recording-and-playback apparatus 101 enters the second standby state. Therefore, an instruction to notify the viewer that the recording-and-playback apparatus 101 enters the second standby state is issued from the recording-and-playback-apparatus-101 side by using the OSD function of the display apparatus 102. At step S309, the control unit 2 transmits a control instruction to the display control unit 21 via the external communication unit 11 and the display external communication unit 19 of the display apparatus 102. The display control unit 21 instructs the OSD unit 23 to perform processing to display information indicating that the recording-and-playback apparatus 101 enters the standby state over a predetermined time period. At the same time, the display control unit 21 instructs the display video selection unit 15 merge text data transmitted from the OSD unit 23 with video data and/or select the text data at predetermined time, and externally transmit the text data over a predetermined time period.

Next, at step S310, it is determined whether or not the viewer transmits an instruction to turn on the power, that is, a request of the recording-and-playback apparatus 101 to perform an operation within a predetermined time period after the standby notification is transmitted at step S309. If the instruction is transmitted (the answer to the determination is YES), the processing advances to step S316. At step S316, the display apparatus 102 is controlled to change the video input selection state so that an external input device to which the recording-and-playback apparatus 101 is connected is selected and data is externally transmitted through the selected external input device. According to the above-described control, an instruction to turn on the power is transmitted to the external instruction reception unit 12 and the instruction is transmitted to the control unit 2. The control unit 2 instructs the power control unit 7 to turn on the power for each of the blocks. After each of the blocks is started, the control unit 2 instructs the display control unit 21 to change the video input selection state via the external communication unit 11 and the display external communication unit 19.

If a result of the determination made at step S310 indicates that the instruction to turn on the power is issued, the control unit 2 advances the processing to step S311. At step S311, it is determined whether an instruction to turn off the power is transmitted from the viewer. If the instruction to turn off the power is transmitted (the answer to the determination is YES), the control unit 2 advances to step S314 and makes the recording-and-playback apparatus 101 enter the first standby state. If the instruction is not transmitted (the answer to the determination is NO), the control unit 2 advances to step S312.

For making the recording-and-playback apparatus 101 enter the first standby state, the control unit 2 instructs the power control unit 7 to enter the first standby state, and the power control unit 7 instructs the power supply 8 to stop supplying power to predetermined blocks.

At step S312, the instruction to turn on the power is not transmitted from the viewer and the control unit 2 waits until a predetermined time elapses. Then, the control unit 2 advances the processing to step S313. At step S312, control unit 2 counts a predetermined time period through a counter. If the value of the counter is smaller than a predetermined value, the processing is returned to step S311. If the value of the counter exceeds the predetermined value, the processing advances to step S313.

If the viewer transmits the instruction to turn on the power at step S313 (the answer to the determination is YES), the control unit 2 returns the recording-and-playback apparatus 101 from the second standby state to its original state and advances to step S315. If the viewer does not transmit the instruction to turn on the power at step S313 (the answer to the determination is NO), the processing advances to step S314 so that the recording-and-playback apparatus 101 is caused to transition to the first standby state, and the processing is finished.

<Advantages of Second Embodiment>

In the second embodiment, the same advantages as those obtained in the first embodiment can be achieved. Further, after the recording-and-playback apparatus 101 enters the second standby state, an instruction to notify the viewer that the recording-and-playback apparatus 101 enters the second standby state is issued from the recording-and-playback-apparatus-101 side by using the OSD function of the display apparatus 102. Therefore, the following advantages can be obtained. Namely, not only the viewer can confirm that the recording-and-playback apparatus 101 had entered the second standby state, but also the recording-and-playback apparatus 101 can immediately return to the starting state when the viewer wishes to view video displayed through the recording-and-playback apparatus 101. On the contrary, it becomes possible to encourage the viewer to perform an operation to make the recording-and-playback apparatus 101 enter the first standby state.

Third Embodiment

Next, a third embodiment of the present invention will be described.

<Configuration According to Third Embodiment>

Figure 6:
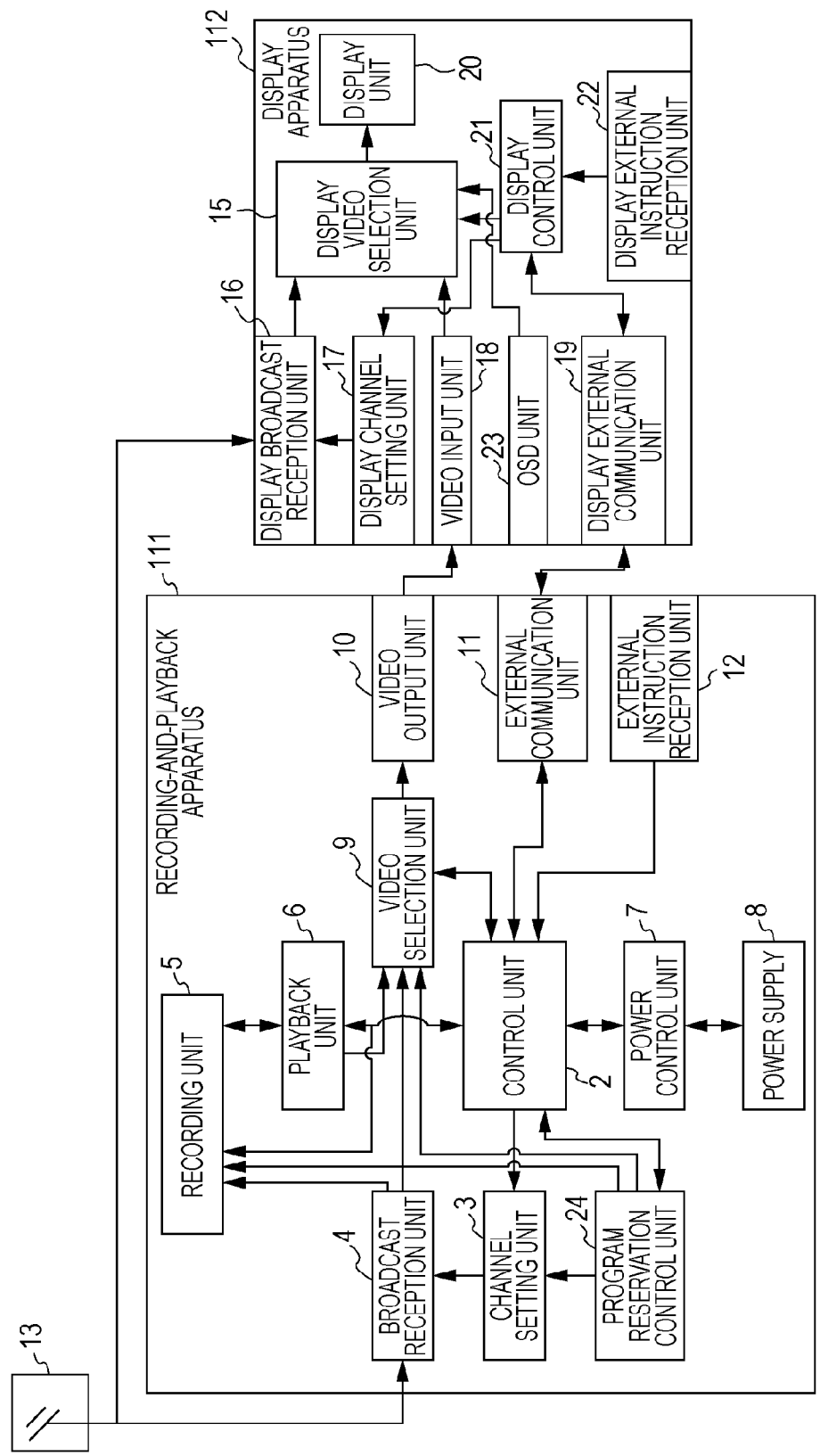
FIG. 6 is a functional block diagram showing a video data outputting apparatus according to a third embodiment of the present invention.

FIG. 6 is a functional block diagram showing a recording-and-playback apparatus 111 according to the third embodiment.

The configuration of the above-described recording-and-playback apparatus 111 is identical to that of the recording-and-playback apparatus 101 of the second embodiment except that a program-reservation control unit 24 is additionally provided. The display apparatus 112 has the same configuration as that of the display apparatus 102 of the second embodiment.

Upon receiving an instruction to make a program recording reservation, the instruction being transmitted from the viewer, the program-reservation control unit 24 controls the program-recording reserved time, a reserved channel, and the execution of the reserved recording. Further, the program-reservation control unit 24 transmits data of a reservation screen image to the video selection unit 9 when the viewer makes the reservation.

Next, operations performed in the third embodiment will be described with reference to FIGS. 7 and 8. FIGS. 7 and 8 show a flowchart indicating control performed by the recording-and-playback apparatus 111 according to the third embodiment.

Since the processing procedures performed at steps S401, S402, S403, S404, S405, S406, S407, S408, and S409 individually correspond to those performed at steps S301 to S309 of the above-described second embodiment, the descriptions thereof will be omitted.

After notifying the viewer that the recording-and-playback apparatus 111 enters the second standby state by using the function of the OSD unit 23 of the display apparatus 112 at step S409, the control unit 2 determines whether or not the viewer transmits an instruction to make the program reservation at step S410. If the viewer transmits the program reservation instruction (when the answer to the determination is YES), the control unit 2 advances to step S411, and the display apparatus 112 is instructed to change the video input selection state so that an external input device to which the recording-and-playback apparatus 111 is connected is selected. According to the above-described control, the control unit 2 receives a program reservation instruction transmitted via the external instruction reception unit 12, and transfers the instruction to the program-reservation control unit 24. The control unit 2 instructs the video selection unit 9 to select and externally transmit data of a program-reservation screen image, the data being transmitted from the program-reservation control unit 24. The program-reservation control unit 24 externally transmits the program-reservation screen image data. Further, the control unit 2 instructs the display control unit 21 to change the video input selection state via the external communication unit 11 and the display external communication unit 19 so that an external input device to which the recording-and-playback apparatus 111 is connected is selected, whereby the display apparatus 112 displays the program-reservation screen image.

Step S412 is performed to make the program reservation. At step S412, the program-reservation control unit 24 makes a program recording reservation based on the viewer's instruction transmitted from the external instruction reception unit 12 via the control unit 2.

At step S413, the program-reservation control unit 24 displays a screen image generated to ask whether or not the viewer would view video obtained through airwaves after the program reservation is made. At step S414, the viewer inputs data indicating either the viewer would view the video or the viewer would not view the video to the displayed screen image. The control unit 2 determines whether or not the viewer would view the video obtained through the airwaves based on the details of the input data. If the viewer selects viewing the video obtained through the airwaves (when YES is selected as the answer to the determination), the control unit 2 advances to step S415 and sets the channel of the airwave currently set in the recording-and-playback apparatus 111, as is the case with step S205. If the viewer selects not viewing the video obtained through the airwaves (when NO is selected as the answer to the determination), the control unit 2 advances to step S416 and makes the recording-and-playback apparatus 111 enter the first standby state.

At step S414, information about the selection result of the viewer is transferred from the program-reservation control unit 24 to the control unit 2. Then, the control unit 2 confirms the selection result of the viewer. When the viewer would view the video obtained through the airwaves (when the answer is YES), the control unit 2 communicates and instructs the display apparatus 112 to change the video input selection state so that the display apparatus 112 selects an external input device to which the recording-and-playback apparatus 111 is connected. When the viewer would not view the video obtained through the airwaves (when the answer is NO), the control unit 2 instructs the power control unit 7 to enter the first standby state so that the recording-and-playback apparatus 111 enters the first standby state. The power control unit 7 instructs the power supply 8 to stop supplying power to each of the blocks other than the control unit 2, the power control unit 7, the external communication unit 11, and the external instruction reception unit 12, as is the case with the first embodiment. Then, the power supply 8 stops supplying power to each of the blocks based on the instruction, and the recording-and-playback apparatus 1 enters the first standby state. After being caused to transition to the first standby state, the recording-and-playback apparatus 1 finishes the processing.

<Advantages of Third Embodiment>

In the third embodiment, the same advantages as those obtained in the first embodiment can be achieved. Further, when the recording-and-playback apparatus 111 is in the second standby state, it becomes possible to perform operations and/or be ready to make the program reservation in short order. Further, it becomes possible to automatically cause the power supply to transition to the first standby state while smoothly shifting to the airwaves without troubling the viewer after the program reservation is made. Therefore, it becomes possible to reduce unnecessary power consumption after predetermined operations are stopped.

It is to be understood that the object of the present invention can also be achieved by performing the following processing. Namely, the processing includes supplying a storage medium storing program code of software for implementing the functions of the above-described embodiments to a system and/or an apparatus so that a computer (a central processing unit (CPU), a microprocessing unit (MPU), and so forth) of the system and/or the apparatus reads the program code stored in the storage medium.

In that case, the program code itself, read from the storage medium, achieves the functions of the above-described embodiments, and thus the program code and the storage medium storing the program code constitute another embodiment of the present invention.

The storage medium for providing the program code may be, for example, a floppy (registered trademark) disk, a hard disk, a magneto-optical disk, a compact disk (CD)-read only memory (ROM), a CD-recordable (R), a CD-rewritable (RW), a digital-versatile disk (DVD)-ROM, a DVD-random access memory (RAM), a DVD-RW, a DVD+RW, a magnetic tape, a nonvolatile memory card, a ROM, etc. Otherwise, the program code may be downloaded via a network.

Further, according to another embodiment of the present invention, the functions of the above-described embodiments are achieved by the computer reading and executing the program code. Still further, according to another embodiment of the present invention, the functions of the above-described embodiments are achieved by the computer executing part of or the entire actual processing utilizing an operating system (OS), etc. running on the computer based on instructions of the program code.

Further, according to another embodiment of the present invention, the program code read from the storage medium may be written into a memory of a function expansion board inserted in the computer and/or a function expansion unit connected to the computer. Then, a CPU, etc. of the function expansion board and/or the function expansion unit executes part of and/or the entire actual processing based on the instructions of the program code.

The present invention allows for automatically stopping the power supply of a recording-and-playback apparatus and reducing an unnecessary power consumption without giving the viewer discomforts such as an interruption of the currently viewed airwaves.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-176891 filed on Jul. 7, 2008, which is hereby incorporated by reference herein in its entirety.

What is claimed is:

1. An image output apparatus including a second receiving unit, connectable to a display apparatus including a first receiving unit, the image output apparatus comprising:
   an output unit configured to output, to the display apparatus, image data recoded in an internal recording unit or an external recording medium and image data generated from the broadcast signal received by the second receiving unit of the image output apparatus;
   a determination unit configured to determine whether the display apparatus displays an image based on image data output from the image output apparatus; and
   a control unit configured to execute control for shifting the image output apparatus to a first low-power consumption state to reduce power consumption amount,
   wherein, in a case where the determination unit determines that the display apparatus displays the image based on the image data output from the image output apparatus, and if the display apparatus displays the image based on the image data generated from the broadcast signal being received by the second receiving unit, the control unit notifies the display apparatus of a channel of the broadcast signal being received by the second receiving unit, and instructs the display apparatus to change from displaying of the image based on the image data output from the image output apparatus to displaying of an image based on image data generated from the broadcast signal, being received by the first receiving unit, of the channel notified by the image output apparatus, and wherein, in a case where the unit determines that displaying on the display apparatus is changed to the displaying of the image based on the image data generated from the broadcast signal, being received by the first receiving unit, of the channel notified by the image output apparatus, the control unit executes control for shifting the image output apparatus to the first low-power consumption state.

2. The image output apparatus according to claim 1, wherein the control unit shifts the image output apparatus to the first low-power consumption state, after output of the image data from the image output apparatus to the display apparatus is stopped, in a case where the determination unit determines that the image based on the image data generated from the broadcast signal received by the second receiving unit is not displayed on the image display apparatus.

3. The image output apparatus according to claim 1, wherein the control unit stops output of the image data from the image output apparatus to the display apparatus, in a case where the determination unit determines that the image based on the image data, being output from the output unit to the image display apparatus, recorded in the internal recording unit provided in the image output apparatus of the external recording medium is not displayed on the display apparatus.

4. The image output apparatus according to claim 1, wherein the control unit shifts the image output apparatus to the first low-power consumption state, in a case where output of the image data from the image output apparatus to the display apparatus is stopped.

5. The image output apparatus according to claim 1, wherein the control unit shifts the image output apparatus to a second lower-power consumption state in which the image output apparatus starts faster than being in the first low-power consumption state, before the control unit shifts the image output apparatus to the first low-power consumption state.

6. The image output apparatus according to claim 5, wherein the control unit shifts the image output apparatus to the first low-power consumption state in a case where there is no request for an operation to the image output apparatus for a certain period of time after shifting to the second low-power consumption state.

7. The image output apparatus according to claim 5, wherein the control unit performs control instruction to the display apparatus so as to display information indicating a shifting to the second low-power consumption state on the display apparatus.

8. An image output method for an image output apparatus including a second receiving unit, connectable to a display apparatus including a first receiving unit, the image output method comprising:

outputting, to the display apparatus, image data recorded in an internal recording unit or an external recoding medium and image data generated from the broadcast signal received by the second receiving unit of the image output apparatus;

determining whether the display apparatus displays an image based on image data output from the image output apparatus;

executing control for shifting the image output apparatus to a first low-power consumption state to reduce power consumption amount, notifying, in a case where it is determined that the display apparatus displays the image based on the image data output from the image output apparatus, and if the display apparatus displays the image based on the image data generated from the broadcast signal being received by the second receiving unit, the display apparatus of a channel of the broadcast signal being received by the second receiving unit, and instructing the display apparatus to change from displaying of the image based on the image data output from the image output apparatus to displaying of an image based on image data generated from the broadcast signal, being received by the first receiving unit, of the channel notified by the image output apparatus, and in a case where it is determined that displaying on the display apparatus is changed to the displaying of the image based on the image data generated from the broadcast signal, being received by the first receiving unit, of the channel notified by the image output apparatus, executing control for shifting the image output apparatus to the first low-power consumption state.

9. A non-transitory computer readable storage medium having program code stored thereon for causing an image output apparatus including a second receiving unit, connectable to a display apparatus including a first receiving unit, the image output method comprising:

outputting, to the display apparatus, image data recorded in an internal recording unit or an external recoding medium and image data generated from the broadcast signal received by the second receiving unit of the image output apparatus;

determining whether the display apparatus displays an image based on image data output from the image output apparatus;

executing control for shifting the image output apparatus to a first low-power consumption state to reduce power consumption amount, notifying, in a case where it is determined that the display apparatus displays the image based on the image data output from the image output apparatus, and if the display apparatus displays the image based on the image data generated from the broadcast signal being received by the second receiving unit, the display apparatus of a channel of the broadcast signal being received by the second receiving unit, and instructing the display apparatus to change from displaying of the image based on the image data output from the image output apparatus to displaying of an image based on image data generated from the broadcast signal, being received by the first receiving unit, of the channel notified by the image output apparatus, and in a case where it is determined that displaying on the display apparatus is changed to the displaying of the image based on the image data generated from the broadcast signal, being received by the first receiving unit, of the channel notified by the image output apparatus, executing control for shifting the image output apparatus to the first low-power consumption state.

* * * * *